United States Patent [19]

Fuerst

[11] Patent Number: 4,893,869
[45] Date of Patent: Jan. 16, 1990

[54] VEHICLE ROOF

[75] Inventor: Arpad Fuerst, Germering, Fed. Rep. of Germany

[73] Assignee: Webasto AG Fahrzeugtechnik, Stockdorf, Fed. Rep. of Germany

[21] Appl. No.: 259,774

[22] Filed: Oct. 19, 1988

[30] Foreign Application Priority Data

Oct. 22, 1987 [DE] Fed. Rep. of Germany ....... 3735686

[51] Int. Cl.$^4$ .............................................. B60J 7/057
[52] U.S. Cl. ..................................... 296/220; 296/223
[58] Field of Search ............... 296/216, 220, 223, 221, 296/222

[56] References Cited

U.S. PATENT DOCUMENTS

| | | | |
|---|---|---|---|
| 4,630,860 | 12/1986 | Fuerst et al. | 296/220 X |
| 4,659,140 | 4/1987 | Fuerst et al. | 296/223 |
| 4,678,228 | 7/1987 | Boots | 296/220 X |
| 4,746,165 | 5/1988 | Fuerst et al. | 296/216 |

FOREIGN PATENT DOCUMENTS

| | | |
|---|---|---|
| 3343902 | 6/1985 | Fed. Rep. of Germany . |
| 3504573 | 8/1986 | Fed. Rep. of Germany . |
| 3523882 | 1/1987 | Fed. Rep. of Germany . |
| 3532111 | 3/1987 | Fed. Rep. of Germany . |

Primary Examiner—Charles A. Marmor
Assistant Examiner—Michael Mar
Attorney, Agent, or Firm—Sixbey, Friedman, Leedom & Ferguson

[57] ABSTRACT

A vehicle roof having a cover which, at its front edge, is displaceably guided in lateral guide rails extending below a fixed roof surface, and which is additionally supported at the guide rails by lifting levers. The lifting levers are connected at one end with the corresponding guide rail, and at the other end with the cover, and are both translatable in the vehicle longitudinal direction and pivotable around parallel axes. During the longitudinal movememt, the levers pivot as a result of interaction with a roof-mounted retaining bracket. The cover can be closed, can be lifted above the fixed roof surface into a vent position by a pivoting movement about an axis at or near its front edge, and can be retracted rearwardly over the fixed roof surface. For the longitudinal movement of the cover, and of the pivotal axis, located at one end of the lifting lever, there are provided separate drive components, which are in permanent engagement with the cover, or with one of the lifting lever ends, respectively.

29 Claims, 4 Drawing Sheets

VEHICLE ROOF

BACKGROUND OF THE INVENTION

The invention relates to a vehicle roof having a cover, which at its front edge is displaceably guided in lateral guide rails extending below the roof surface, and which is additionally supported at the guide rails by lifting levers, which are connected at one end with the corresponding guide rails, and at the other end with the cover. During displacement of the cover in the longitudinal direction of the vehicle, the levers pivot and slide as a result of interaction with a roof-mounted retaining bracket, so that the cover can selectively be (1) brought into a closed position; (2) extended above the roof surface into a vent position by a pivoting movement around an axis which is disposed at or near its front edge; or (3) rearwardly retracted above the fixed roof surface.

In a known vehicle roof of this kind (German Offenlegungsschrift No. 35 04 573 in combination with German Offenlegungsschrift No. 33 43 902), the cover is pivotably supported in the front at each side, at a slide shoe which can be coupled with a drive cable by means of a follower assembly determining a free path. One end of a lifting lever is pivotably connected to a slider which is connected with a locking lug via a biased support arm. This lug is coupled with the movable part of the drive cable by means of an additional follower assembly. Once the cover reaches a pivot position which corresponds to its open end position, the coupling between the slider and the drive cable is released, and the lug slides into a recess of the guide rail. To bring the cover into the vent position, starting from the closed position, the slider, coupled with the drive cable, is pulled forwardly, while the slide shoe is uncoupled from the drive cable. When the cover is to be retracted, it is necessary to initially bring it into the closed position, whereupon the slider and slide shoe are coupled with the drive cable, and are simultaneously slid rearwardly, until after a certain distance, the slider is uncoupled from the drive cable, and the slide shoe only is taken along further rearwardly. In this conventional arrangement, the coupling and locking elements for the coupling and uncoupling of the drive cables at the slide shoe and slider are susceptible to malfunctions and produce rattling noises during travel. Furthermore, the stability of the resulting vehicle roof leaves much to be desired. Comparable to these known arrangements also is that disclosed in U.S. Pat. No. 4,746,165.

SUMMARY OF THE INVENTION

It is the objective of the present invention to develop a vehicle roof of the kind described before which ensures a particularly secure, stable, and reliable guidance of the cover over the entire range of cover displacement.

This objective is achieved, in accordance with preferred embodiments of the present invention, in that, for the longitudinal displacement of the cover and the pivotal axis, separate drive elements are provided which are in permanent engagement with the cover or with one of the lifting lever ends, respectively. This arrangement ensures a positive guidance of both the cover and lifting levers in any cover position.

In another development of the invention, two drive elements are controlled such that for the extension of the cover into the vent position, the ends of the lifting levers are rearwardly displaced by the associated drive element, while the first drive elements are at rest. By subsequent activation of the first drive element, the cover can be retracted starting directly from the vent position. Thus, when the cover is to be moved from the vent position into a retracted position, or vice versa, it is not necessary to first traverse the cover's closed position.

Advantageously, the arrangement is such that in the movement of the cover between the vent position and fully retracted position, the pivotal axis, coordinated to the one end of the lifting lever, moves longitudinally along the associated guide rail a distance which is less than 20% and, preferably, is less than 10% of the distance moved by the forward cover edge. Due to a special design, the roof mounted retaining brackets cooperating with the lifting levers can be relatively short, which is another factor contributing to the stability of the cover guidance assembly.

Advantageously, the point of connection of the lifting lever to the cover, over the entire range of the cover displacement, is behind the pivotal axis which lies at one end of the lever, so that the lifting lever, even with the cover closed, acts upon the cover at a point which is relatively far to the rear, thereby providing stable support of the cover.

The drive elements, in one embodiment, have two sets of drive cables. One set of drive cables is connected to slide shoes which support the cover, in the area of its forward edge, for displacement along the associated guide rails. The other set of drive cables is connected with sliders that are, likewise, displaceable along the guide rails, and to which one of the lifting levers is pivotably connected. Alternatively, as is disclosed in German Offenlegungsschrift No. 35 23 882, each of the two drive cable sets may have its own drive motor, or the two drive cables may be connected with a common primary drive source via a separate distributor gear assembly which facilitates separate and displacement movement of the drive cables at differing drive ratios. Such a distributor gear assembly is disclosed in German Offenlegungsschrift No. 35 45 869 and corresponding U.S. Pat. No. 4,659,140.

Advantageously, a retaining bracket for the lifting lever has a slot which is slideably engaged by a retaining bracket pin, laterally projecting from the lifting lever; whereby the slot has a first section that slopes upwardly to the rear, for extending the cover into the vent position, and further has a rearward second section adjacent thereto which has a slope which varies from that of the first section. This configuration minimizes the cover extension angle during retraction, thereby keeping wind resistance low even at high driving speeds. To the rear of the second section of the slot, there can be a third section extending parallel to the guide rails, which permits adjustment to compensate for tolerances. Preferably, the forward end of the slot opens into a guide groove of the associated guide rail which serves to guide the slide shoes and the sliders. Utilization of this guide groove, which is already an existing part of the assembly, for guidance of the retaining bracket pin facilitates a low-height construction, which is significant in the interest of increased headroom.

In accordance with a further embodiment of the invention, the lifting lever has an additional laterally-projecting retaining bracket pin, which, when the cover approaches its closed position, enters into a further slot of the retaining bracket, which is open to the top. The further slot appropriately terminates at its end, which is remote from the open end, in a forward end section that extends parallel to the associated guide rail. The forward end section is engaged by the additional retaining bracket pin in the closed position of the cover. This arrangement helps to stabilize the cover in the closed position. Even at high speeds, the cover is kept from vibrating, and furthermore, this design increases security against thefts perpetrated by forcing open a closed cover.

The lifting levers, advantageously, have a two-part design, and for the cover's height adjustment, the two lifting lever elements, in the closed position, pivot relative to each other around an additional retaining bracket pin. In this manner, cover elevation can be adjusted in a simple manner without changing the engagement relationship of the lifting levers and the associated retaining brackets.

In the cover's adjustment range between the closed position and the vent position, the point of application of the lifting lever at the cover, preferably, has a distance from the cover's rear edge which is less than 15% of the cover's longitudinal dimension. Such arrangement ensures that guidance of the cover is particularly stable, and that the set position is reliably retained.

The adjusting levers may have a guidance pin at their other end, which displaceable engages a guide channel of the cover support rail located at the underside of the cover, and advantageously, has a roller which rests against a flange of the cover support rail.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
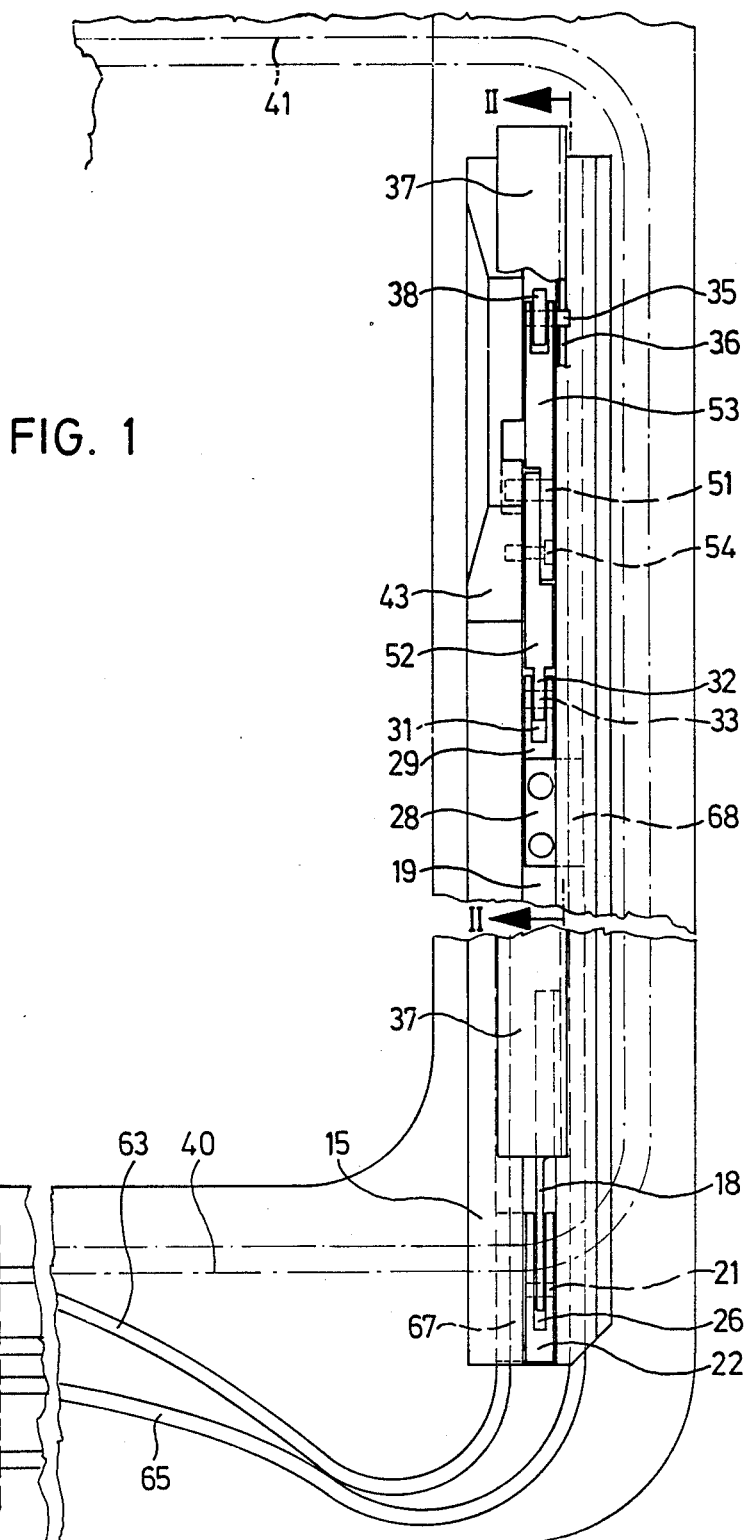
FIG. 1 is a partial top view of the vehicle roof, with the cover in the closed position.

A roof opening 11 is provided in a fixed roof surface 10 of a vehicle roof, which, selectively, can either be closed or can be at least partially exposed by way of a cover 12. Below the roof opening 11, there is a roof frame 13 which forms a rain gutter 14. On both sides of roof opening 11, and disposed symmetrically with respect to the vehicle's central longitudinal axis, the roof frame 13 has a longitudinally extending guide rail. Because of this symmetry in the design, a detailed description of the assembly is provided for one side of the roof only.

In the front, cover 12 is supported on both sides by a cover support member 16, which has a leg 18 which forwardly projects beyond the front edge 17 of cover 12. Leg 18 extends into a center guide channel 19 of guide rail 15. The channel is open on the top and extends in the longitudinal direction of the vehicle. The front end of leg 18 is also pivotably connected by way of a connecting pin 21 to a slide shoe 20, which is movable along guide rail 15. Slide shoe 20 has a vertical leg 22, guided in channel 19, as well as crosspieces 23 that project bilaterally from the bottom of leg 22 into guide grooves 24 and 25 of guide rail 15. Guide grooves 24 and 25 extend laterally outwardly and inwardly, respectively, from guide channel 19. Leg 22 has a longitudinal slot 26 which is open to the top and the rear and serves to laterally guide leg 18 during the pivotal movement of the cover. The connecting pins 21 of cover supports 16 define a cover pivotal axis which is positioned forward of and beneath the cover front edge 17.

Cover 12 is supported on guide rails 15, rearwardly of supports 16 on both sides, by a lifting lever 27 and an associated slider 28. Similar to slide shoe 20, slider 28 has a vertical leg 29 that is longitudinally displaceable in guide channel 19, and from the bottom of which crosspieces 30 laterally project into guide grooves 24 and 25 of guide rail 15. Leg 29 has a longitudinal slot 31 which is open to the top and the rear, and into which one end 32 of lifting lever 27 extends. Lifting lever 27 is pivotably connected at its forward end 32 with slider 28 by means of a connecting bolt 33 which forms a horizontal pivotal axis for lever 27 relative to slider 28 at a part of the lifting lever 27 which is adjacent to end 32 and is received in guide channel 19.

Figure 7:
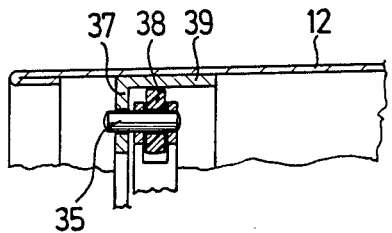
FIG. 7 is a sectional view along line VII—VII of FIG. 3.

Lifting lever 27 has a guide pin 35 at its opposite, rearward end 34, which forms a pivotal axis for lifting lever 27 relative to cover 12 and parallel to the axis of connecting bolt 33. Guide pin 35 displaceably engages a guide channel 36 of longitudinally extending cover support rail 37 which is located at the underside of cover 12. A roller 38 is rotatably supported on guide pin 35. Roller 38 contacts the underside of a flange 39 of cover support rail 37, which is disposed in parallel to the edge of cover 12 (FIG. 7).

Guide rail 15 extends to the front, at least up to the forward edge 40 of roof opening 11, and terminates in the rear, short of rear edge 41 of the roof opening. Near the rear edge of guide rail 15, in the inner portion with respect to the roof opening 11, there is a cutout 42 having a guide retaining bracket inserted therein and fixedly connected with guide rail 15. Retaining bracket 43 at the side facing lifting lever 27 has a slot 44 which slideably receives a retaining bracket pin 45, which is secured to lifting lever 27, laterally projecting therefrom. Slot 44 has a frontal first section 46 sloping upwardly to the rear, a second section 47 adjacent thereto, sloping downwardly to the rear, and a short third section 48 in the rear, adjacent to the second section, which extends parallel to guide rail 15. Slot 44 opens in the front into guide groove 25 of guide rail 15. In the forward part of retaining bracket 43, there is another slot 49 above the first section 46 of slot 44. Slot 49 is open towards the upper side of retaining bracket 43 and extends from there obliquely to the front and below. Slot 49 terminates, at an end which is remote from the open top end, in a frontal end section 50 which is parallel to guide rail 15. Another laterally projecting retaining bracket pin 51 of lifting lever 27 cooperates with slot 49.

Figure 5:
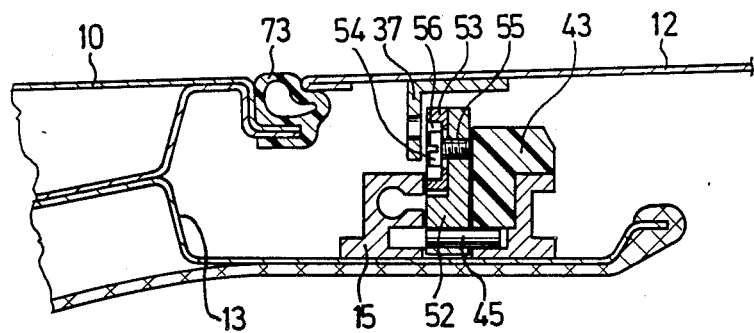
FIG. 5 is a sectional view along line V—V of FIG. 2.

In the example depicted, lifting lever 27 has a two-part design, i.e. it comprises a first lifting lever element 52 containing connecting bolt 33 and retaining bracket pin 45, as well as a second lifting lever element 53 with guide pin 35. The retaining bracket pin 51 forms a pivotal axis around which the two lifting lever elements 52 and 53 can be pivoted relative to each other, through a limited angle, after screw 54 has been loosened. Screw 54 is screwed into a tapped hole 55 of lifting lever element 52, with its end which is remote from its screw head which penetrates an elongated hole 56 of lifting lever element 53 (FIG. 5).

A drive unit, schematically indicated in FIG. 1 with reference numeral 60, has a first drive pinion 61 and a second drive pinion 62. Drive pinion 61 cooperates with a first pair of drive cables 63 and 64, while the second drive pinion 62 is in engagement with a second pair of drive cables 65 and 66. A connecting piece 67 effects a permanently fixed drive connection between slide shoe 20 and an end of drive cable 63, while an end of drive cable 65 is permanently, fixedly coupled with slider 28 via a connecting piece 68. Correspondingly, drive cables 64 and 66 are permanently, fixedly connected with the slide shoe or, respectively, with the slider, on the other side of the roof (not shown).

Figure 8:
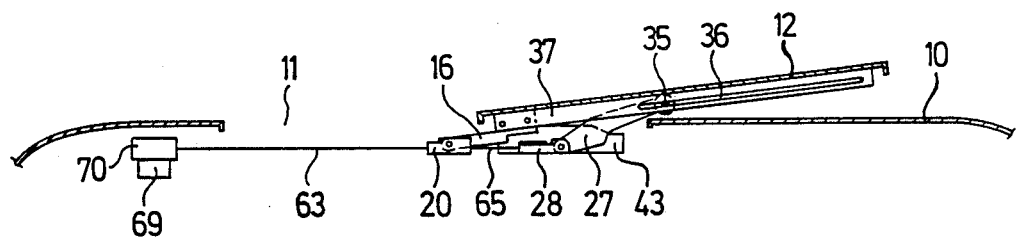
FIG. 8 is a longitudinal sectional view of the vehicle roof with a single-motor drive assembly.
Figure 9:
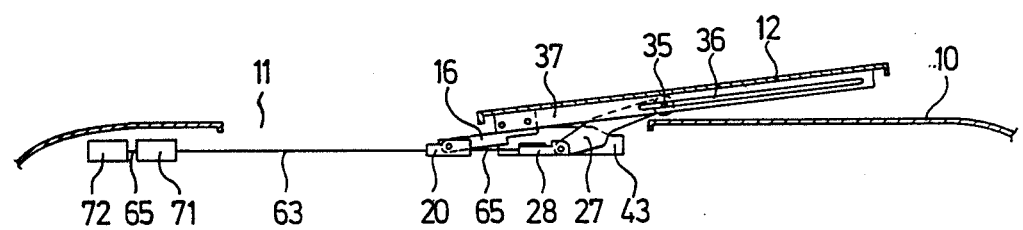
FIG. 9 is a longitudinal sectional view of the vehicle roof showing a two-motor drive assembly.

Drive unit 60, in accordance with the schematic representation of FIG. 8, can consist of a primary drive source 69, e.g., a hand crank or an electric motor, and a distributor gear assembly 70, connected on the drive side with primary drive source 69, whose outputs are comprised of the two drive pinions 61 and 62. Such a distributor gear assembly is disclosed in the noted German Offenlegungsschrift No. 35 45 869 and U.S. Pat. No. 4,659,140. The distributor gear assembly permits operation of the two drive pinions 61 and 62 independently of each other with different rotational speeds and, simultaneously, provides a desired coordination of the rotational movements of the two pinions. Alternatively, independent drive motors 71 and 72 can be provided for the drive of pinions 61 and 62, in accordance with FIG. 9 of the drawings, and as described in German Offenlegungsschrift No. 35 32 111.

Figure 2:
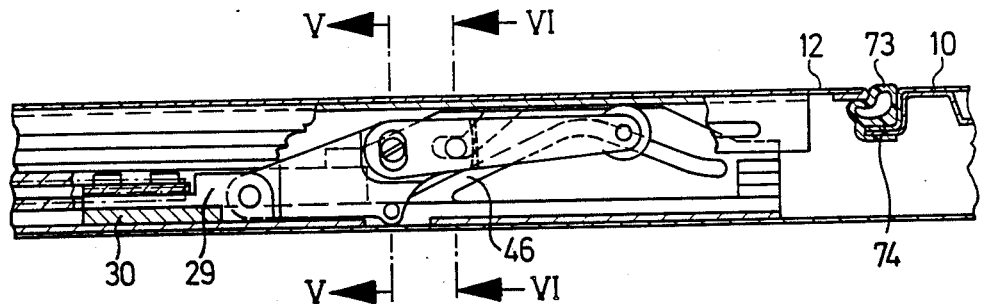
FIG. 2 is a sectional view along line II—II of FIG. 1, with the cover in closed position.
Figure 6:
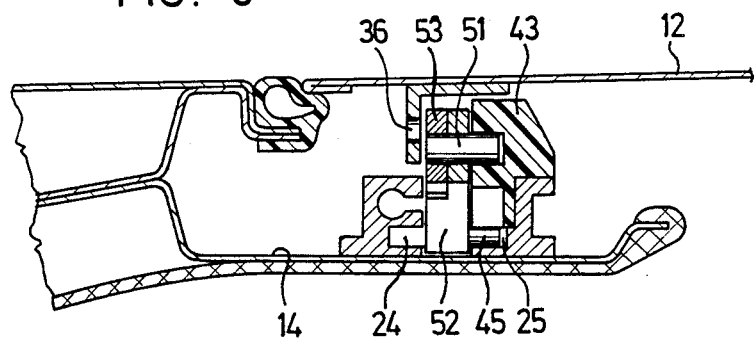
FIG. 6 is a sectional view along line VI—VI of FIG. 2.

In the closed position of cover 12, slide shoe 20 is positioned at the forward end of guide rail 15. Slider 28 assumes its forward end position in accordance with FIGS. 1 and 2. The retaining bracket pin 45 extends into the guide grooves 25 of guide rail 15 (FIGS. 2 and 6). Retaining bracket pin 51 is in engagement with the forward end section 50 of slot 49, while guide pin 35 is positioned near the rearward end of guide channel 36. Cover 12, at its outer edge, is seated on seal 73, which is fitted onto a downturned flange 74 of the fixed roof area 10. The engagement between retaining bracket pin 51 and end section 50 of slot 49 extending parallel to guide rail 15, causes cover 12 to be retained in firm contact with seal 73, even in the area of its rear edge 75. A lifting of cover 12, by the effects of head winds or in the event of a theft attempt, is positively prevented.

Figure 3:
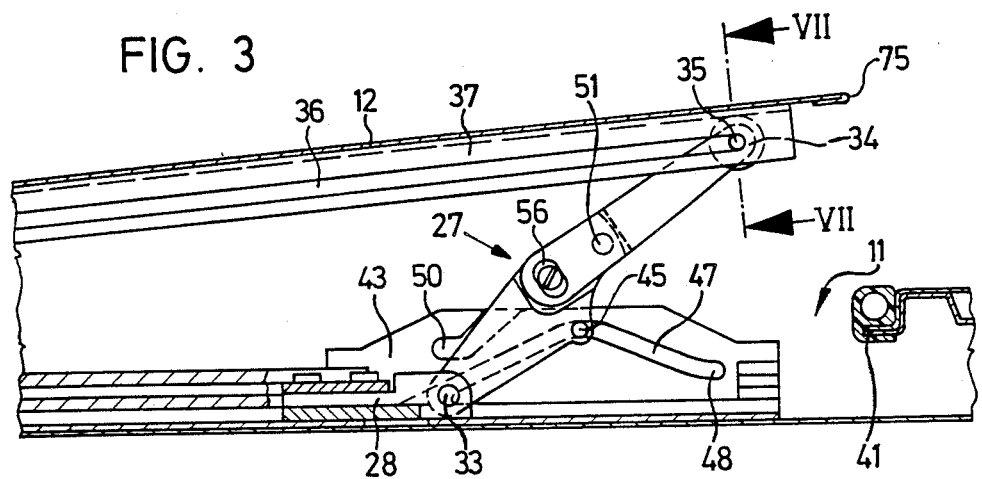
FIG. 3 is a sectional view according to FIG. 2, with the cover in the vent position.

If the cover is to be extended into the vent position, as shown in FIG. 3, drive pinion 62 is operated while drive pinion 61 remains stationary. Sliders 28, at both sides of the roof opening, are moved from the FIG. 2 position into the FIG. 3 position via drive cables 65 and 66. Advantageously, this displacement movement occurs at relatively low speed to facilitate a reliable approach towards any intermediate position between the closed position and fully extended vent position. Retaining bracket pin 51 leaves the forward end section 50 of slot 49 and enters into the upwardly sloping part 76 of slot 49, eventually leaving slot 49 entirely.

Retaining bracket pin 45 changes over from guide groove 25 to slot 44 and travels upwardly along section 46, causing lifting lever 27, in FIGS. 2 and 3, to pivot around pin 35 in counterclockwise direction, resulting in a rotational movement of the cover around the axis formed by connecting pins 21. Due to the position of the pivot axis forward of the front edge 40 of roof opening 11, when cover 12 is between the closed position and the vent position, there is no compression of seal 73, even in the area of front edge 40. Cover 12 is fully extended into the vent position with its rear edge 75 above the fixed roof area 10, when retaining bracket pin 45 reaches the highest point of slot 44 as shown in FIG. 3. In this position, guide pin 35 is at the rearward end of guide channel 36, in proximity to the rear edge 75 of cover 12. Because the extended cover 12 is supported at the closest proximity to its rear edge 75, a particularly solid support results. Even accelerated driving speeds do not cause disturbing vibrations of the cover.

Figure 4:
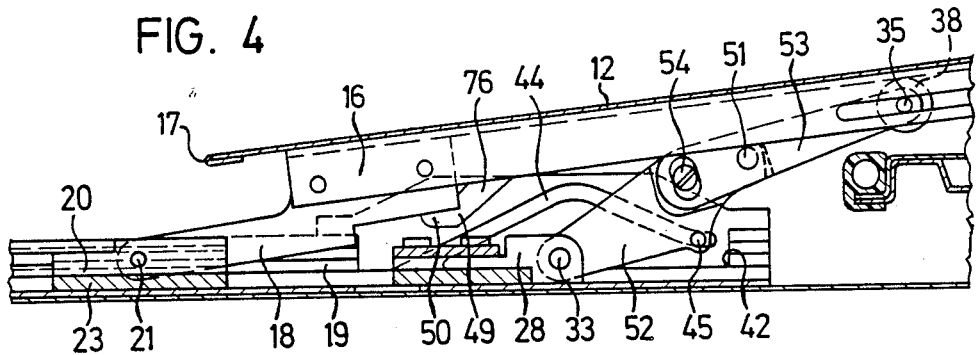
FIG. 4 is a sectional view according to FIG. 2, with the cover retracted.

Starting directly from the FIG. 3 vent position, cover 12 can be moved rearwardly as shown in FIG. 4 by now operating pinion 61. Slide shoes 20, at both sides of roof opening 11, are moved rearwardly along guide rails 15 via drive cables 63, 64. Simultaneously, drive pinion 62 operates in the same rotational direction as that of drive pinion 61. As a consequence of the rearward displacement movement of the cover, slider 28 also is moved in the direction toward the rearward end of guide rail 15, with the result that retaining bracket pin 45 in section 47 of slot 44 travels rearwardly and downwardly, causing lifting lever 27 (shown in FIGS. 3 and 4) to rotate around bolt 33 in a clockwise direction. With consideration to the benefits of flow mechanics, the incline of the cover is reduced to the minimum value which is required for the cover to be moved rearwardly without hitting the rear edge of roof opening 11. If desired, the operation can be such that, starting from the FIG. 3 vent position, slider 28 initially is moved back into its rearward end position as shown in FIG. 4, and only thereafter slide shoe 20 is moved rearwardly.

During the transition of cover 12 from the retracted position into the vent position (FIG. 3) and the closed position (FIG. 2), the operations described occur in reverse order and sequence, respectively.

Section 48 of slot 44 permits a compensation of manufacture and assembly tolerances, relative to the longitudinal dimension, between slider 28 and the contact point of the associated drive cable 65 (i.e., drive pinion 62).

The basic general height adjustment of cover 12, with respect to the fixed roof area 10, occurs after loosening of screw 54 due to a pivoting of the two lifting lever elements 52 and 53 relative to each other. When cover 12, in its closed position, is aligned with the fixed roof area 10, screw 54 is tightened. As the pivoting action of the lifting lever elements 52 and 53 relative to each other occurs around retaining bracket pin 51, due to the height adjustment, the coaction between retaining bracket pin 51 and slot 49 is not affected.

In the example depicted, bolt 33, in the displacement range of the cover between the FIG. 3 vent position and the FIG. 4 fully retracted position, moves about 9% of the distance moved by the front edge 17 of cover 12 or that of the connecting pin 21, respectively. Retaining bracket pin 45 moves relative to cover 12 over the entire duration of movement by cover 12, i.e. from the FIG. 2 cover position up to the FIG. 4 cover position. However, the path of movement of pin 45 amounts to about only 22% of the distance moved by front edge 17 of cover 12 or the connecting pin 21 in the longitudinal direction of guide rail 15. In the distance moved by cover 12, between the closed position (shown in FIG. 2) and the vent position (shown in FIG. 3), guide pin 35 has a distance from the cover's rear edge 75 which is less than 14% of the longitudinal cover dimension.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A vehicle roof having a cover which, at a front edge, is slidably guided in lateral guide rails extending below a fixed roof surface, said cover being additionally supported at the guide rails by lifting levers, each of said lifting levers being connected at a first end with a respective guide rail and at an opposite end with the cover, in a manner enabling said levers to be displaceable relative to said guide rails in a vehicle longitudinal direction and to be pivotable around parallel rotational axes, during displacement in the vehicle longitudinal direction, by a pin and slot type interaction with a fixed roof-mounted retaining bracket, whereby the cover, selectively, can be shifted to a closed position covering an opening in the fixed roof surface, a vent position wherein a rear edge of the cover is lifted above the fixed roof surface by a pivoting movement, and an open position wherein the cover is rearwardly retracted above the fixed roof surface; wherein separate first and second drive elements are provided permanently coupled, respectively, with the cover and with one of the lifting lever ends for producing the longitudinal and pivotal displacements of the cover.

2. A vehicle roof according to claim 1, wherein means for controlling said drive elements are provided which, during displacement of the cover into the vent position, causes said first ends of the lifting levers to be moved rearwardly by said second drive elements, while the first drive elements are inactive and which, by subsequent activation of the first drive elements, causes the cover to be retracted rearwardly, starting directly from the vent position.

3. A vehicle roof according to claim 2, wherein guide means for the cover and for the lifting lever are coordinated in a manner producing, in a range of cover displacement between the vent position and the fully retracted position, a displacement of said rotational axis of the lifting lever, in a longitudinal direction of the respective guide rail, of a distance that is less than 20% of a distance moved by the front edge of the cover.

4. A vehicle roof according to claim 1, wherein guide means for the cover and for the lifting lever are coordinated in a manner producing, in a range of cover displacement between the vent position and the fully retracted position, a displacement of said rotational axis of the lifting lever, in a longitudinal direction of the respective guide rail, of a distance that is less than 20% of a distance moved by the front edge of the cover.

5. A vehicle roof according to claim 1, wherein over the entire displacement range of the cover, the lifting lever is connected to the cover at a point rearwardly of said rotational axis.

6. A vehicle roof according to claim 1, wherein the first and second drive elements comprise, at a respective side of the opening, a pair of drive cables; wherein one drive cable of each pair is connected with a slide shoe that is displaceable along the respective guide rail and on which slide shoe the cover is supported in an area of a forward end thereof; and wherein the other drive cable of each pair is connected with a slider which is displaceable along the respective guide rail and to which slider the first end of the lifting lever is pivotably connected.

7. A vehicle roof according to claim 6, wherein a separate drive motor is provided for each of the first and second drive elements for displacing a respective drive cable of each pair.

8. A vehicle roof according to claim 6, wherein the first and second drive elements are connected with a common primary drive source via a distributor gear in a manner enabling independent displacement movements of the drive cables of each pair at differing speeds.

9. A vehicle roof according to claim 1, wherein said pin and slot type interaction is produced by the retaining bracket having a slot which is slidably engaged by a retaining bracket pin projecting laterally from the lifting lever.

10. A vehicle roof according to claim 9, wherein the retaining bracket pin is movable a distance, over the entire displacement range of the cover, which in the longitudinal direction of the guide rail is less than 40% of the distance moved by the cover at a front edge thereof.

11. A vehicle roof according to claim 10, wherein said slot has a forward, rearwardly upwardly sloping first section, and rearwardly adjacent thereto has a second section having a slope which is different from that of the first section.

12. A vehicle roof according to claim 11, wherein the second section slopes downwardly to the rear.

13. A vehicle roof according to claim 11, wherein, at the rear of the second section of the slot, there is an adjacent third section which is parallel to the guide rails.

14. A vehicle roof according to claim 9, wherein said slot has a forward, rearwardly upwardly sloping first section, and rearwardly adjacent thereto has a second section having a slope which is different from that of the first section.

15. A vehicle roof according to claim 14, wherein the second section slopes downwardly to the rear.

16. A vehicle roof according to claim 14, wherein, at the rear of the second section of the slot, there is an adjacent third section which is parallel to the guide rails.

17. A vehicle roof according to claim 6, wherein the retaining bracket has a slot which is slidably engaged by a retaining bracket pin projecting laterally from the lifting lever.

18. A vehicle roof according to claim 19, wherein said slot has a forward, rearwardly upwardly sloping first section, and rearwardly adjacent thereto has a second section having a slope which is different from that of the first section.

19. A vehicle roof according to claim 18, wherein the second section slopes downwardly to the rear.

20. A vehicle roof according to claim 18, wherein, at the rear of the second section of the slot, there is an adjacent third section which is parallel to the guide rails.

21. Vehicle roof according to claim 6, wherein the retaining bracket has a slot which is slidably engaged by a retaining bracket pin projecting laterally from the lifting lever, and a forward end of the slot opens into a guide groove of the respective rail serving to guide a respective slide shoe and slider.

22. A vehicle roof according to claim 9, wherein the lifting lever has an additional retaining bracket pin which projects laterally therefrom; and which, when the cover approaches the closed position, enters an open upper end of an additional slot of the retaining bracket.

23. A vehicle roof according to claim 22, wherein the additional slot of the retaining bracket has, at an end which is remote from the open end, a forward end section which is parallel to the respective guide rail, which section is engaged by said additional retaining bracket pin in the closed position of the cover.

24. A vehicle roof according to claim 23, wherein the lifting levers are each comprised of two lifting lever elements which, as a means for adjusting the height of the cover in the closed position, are displaceable relative to each other and are fixable relative to each other at selected positions of relative displacement.

25. A vehicle roof according to claim 24, wherein the two lifting lever elements are also displaceable relative to each other around said additional retaining bracket pin.

26. A vehicle roof according to claim 1, wherein the first end of the lifting lever is received in a guide channel, which is open to the top, of a respective guide rail.

27. A vehicle roof according to claim 1, wherein guide means for the cover and for the lifting lever are coordinated in a manner causing, in a displacement range of the cover between the closed position and the vent position, a point at which the lifting lever connects with the cover to have a distance from a rear edge of the cover which is less than 30% of the cover dimension in the longitudinal direction of the vehicle.

28. A vehicle roof according to claim 1, wherein said opposite ends of the lifting levers have a guide pin which displaceably engages a cover support rail located at an underside of the cover.

29. A vehicle roof according to claim 28, wherein the guide pin carries a roller which contacts against a flange of the cover support rail.

* * * * *